(12) United States Patent
Hu et al.

(10) Patent No.: US 12,234,796 B2
(45) Date of Patent: Feb. 25, 2025

(54) POWER DISTRIBUTION MANAGEMENT METHOD AND DEVICE FOR HYBRID VEHICLE

(71) Applicant: GREAT WALL MOTOR COMPANY LIMITED, Baoding (CN)

(72) Inventors: Zhimin Hu, Baoding (CN); Bao Liu, Baoding (CN); Wentao Hou, Baoding (CN); Zengli Wang, Baoding (CN); Zhehui Shen, Baoding (CN); Guixian Guo, Baoding (CN)

(73) Assignee: Great Wall Motor Company Limited, Baoding (CN)

( * ) Notice: Subject to any disclaimer, the term of this patent is extended or adjusted under 35 U.S.C. 154(b) by 170 days.

(21) Appl. No.: 18/013,367

(22) PCT Filed: Aug. 18, 2021

(86) PCT No.: PCT/CN2021/113152
§ 371 (c)(1),
(2) Date: Dec. 28, 2022

(87) PCT Pub. No.: WO2022/037597
PCT Pub. Date: Feb. 24, 2022

(65) Prior Publication Data
US 2023/0235719 A1   Jul. 27, 2023

(30) Foreign Application Priority Data
Aug. 21, 2020   (CN) .......................... 202010852154.9

(51) Int. Cl.
*B60W 10/06* (2006.01)
*B60W 20/15* (2016.01)
*F02N 11/08* (2006.01)

(52) U.S. Cl.
CPC ......... *F02N 11/0803* (2013.01); *B60W 20/15* (2016.01); *B60W 10/06* (2013.01);
(Continued)

(58) Field of Classification Search
CPC ................. B60W 10/06; B60W 20/15; B60W 2510/081; B60W 2510/083; B60W 2540/106; F02N 11/0803; F02N 2200/101
See application file for complete search history.

(56) References Cited

U.S. PATENT DOCUMENTS 8,731,762 B1 * 5/2014 Wang .................... B60W 10/06
701/22
10,858,004 B2 * 12/2020 Awadi .................... B60W 10/11

FOREIGN PATENT DOCUMENTS

CN   110667588 A   1/2020
CN   111516688 A   8/2020
(Continued)

*Primary Examiner* — Gonzalo Laguarda
(74) *Attorney, Agent, or Firm* — Boyle Fredrickson, S.C.

(57) ABSTRACT

A power distribution management method includes receiving accelerator pedal opening information sent by a hybrid vehicle; on the basis of the accelerator pedal opening information, respectively compiling statistics on a first opening change rate when the accelerator pedal opening is in a starting interval and when the accelerator pedal opening is increased and a second opening change rate when the accelerator pedal opening is in an overtaking interval and when the accelerator pedal opening is increased, the starting interval corresponding to a first preset range of the accelerator pedal opening, and the overtaking interval corresponding to a second preset range of the accelerator pedal opening; calculating a driver feature coefficient on the basis of the first opening change rate and the second opening change rate; and sending the driver feature coefficient to the hybrid vehicle.

6 Claims, 4 Drawing Sheets

(52) U.S. Cl.
CPC . *B60W 2510/081* (2013.01); *B60W 2510/083* (2013.01); *B60W 2540/106* (2013.01); *F02N 2200/101* (2013.01)

(56) References Cited

FOREIGN PATENT DOCUMENTS

| | | |
|---|---|---|
| CN | 113173154 A | 7/2021 |
| JP | 2006094688 A | 4/2006 |

\* cited by examiner

POWER DISTRIBUTION MANAGEMENT METHOD AND DEVICE FOR HYBRID VEHICLE

CROSS-REFERENCE TO RELATED APPLICATIONS

The present application is a National Phase entry of PCT Application No. PCT/CN2021/113152, filed on Aug. 18, 2021, which claims the priority to Chinese Patent Application No. 2020108521549, titled "POWER DISTRIBUTION MANAGEMENT METHOD AND DEVICE FOR HYBRID VEHICLE", filed with the China National Intellectual Property Administration on Aug. 21, 2020, the entire disclosures of which are incorporated herein by reference.

TECHNICAL FIELD

The present application relates to the technical field of vehicles, and in particular to a power management method and device for a hybrid vehicle.

BACKGROUND OF THE INVENTION

Multiple power sources can be used in a hybrid vehicle, so how to well coordinate the working states of the multiple power sources is a problem.

There are mainly two power sources in the hybrid vehicle: engine and motor. The torque response of the engine is slow at a low speed with a low efficiency, and the efficiency is high at a medium speed and a high speed. The motor has a fast torque response at a low speed, but the torque and efficiency drop sharply at a high speed. Therefore, the current power distribution strategy of the hybrid vehicle is that: the engine is not started and the vehicle is driven by the motor when an accelerator pedal opening is less than an accelerator pedal opening threshold; the engine is started when the accelerator pedal opening is not less than the accelerator pedal opening threshold. The engine is used as the main driving source when the engine is started, and the motor is used for auxiliary driving or adjusting an engine load point.

At present, the accelerator pedal opening threshold for starting the engine is a constant value determined mainly based on an engine characteristic curve, a motor characteristic curve and the project experience of the engineer. However, due to the differences in the use habits of drivers, the constant accelerator pedal opening threshold cannot accurately meet the needs of each driver.

SUMMARY OF THE INVENTION

In view of this, a power distribution management method and device for a hybrid vehicle are provided according to the present application, which are configured to solve the technical problem that the constant accelerator pedal opening threshold cannot accurately meet the needs of each driver.

In order to achieve the above object, the technical solution of the present application is provided as follows.

A power distribution management method for a hybrid vehicle includes: receiving an accelerator pedal opening information sent by the hybrid vehicle; respectively counting, based on the accelerator pedal opening information, a first opening change rate when an accelerator pedal opening is in a starting interval and when the accelerator pedal opening is increased, and, a second opening change rate when the accelerator pedal opening is in an overtaking interval and when the accelerator pedal opening is increased, in which the starting interval corresponds to a first preset range of the accelerator pedal opening, and the overtaking interval corresponds to a second preset range of the accelerator pedal opening; calculating a driver feature coefficient based on the first opening change rate and the second opening change rate; and sending the driver feature coefficient to the hybrid vehicle, so that the hybrid vehicle determines an accelerator pedal opening threshold based on the driver feature coefficient.

Further, the first opening change rate $G_q$ when the accelerator pedal opening is in the starting interval and when the accelerator pedal opening is increased is calculated according to the following formula:

$$G_q = \frac{K_{t+\Delta t} - K_t}{\Delta t};$$

where, $K_{t+\Delta t}$ is the accelerator pedal opening at time $t+\Delta t$, $K_t$ is the accelerator pedal opening at time $t$, and $\Delta t$ is a sampling interval, $30\% > K_t > 10\%$.

Further, the second opening change rate $G_c$ when the accelerator pedal opening is in the overtaking interval and when the accelerator pedal opening is increased is calculated according to the following formula:

$$G_c = \frac{K_{t+\Delta t} - K_t}{\Delta t};$$

where, $K_{t+\Delta t}$ is the accelerator pedal opening at time $t+\Delta t$, $K_t$ is the accelerator pedal opening at time $t$, and $\Delta t$ is a sampling interval, $80\% > K_t > 60\%$.

Further, the calculating a driver feature coefficient based on the first opening change rate and the second opening change rate includes: calculating a first historical average opening change rate $G_{q_{avg}}$ when the accelerator pedal opening is in the starting interval based on the first opening change rate; calculating a second historical average opening change rate $G_{q_{avg}}$ when the accelerator pedal opening is in the overtaking interval based on the second opening change rate; and calculating the driver feature coefficient according to the following formula based on the first historical average opening change rate $G_{q_{avg}}$ and the second historical average opening change rate $G_{q_{avg}}$:

$$K = \frac{k_q * G_{q_{avg}} + k_c * G_{c_{avg}}}{G_n},$$

where, $k_q + k_c = 1$,
where, $K$ is the driver feature coefficient, $k_q$ is a weighting coefficient corresponding to the first historical average opening change rate $G_{q_{avg}}$, $k_c$ is a weighting coefficient corresponding to the second historical average opening change rate $G_{q_{avg}}$, and $G_n$ is a preset opening change rate.

Further, $k_q > k_c$.

Further, the calculating a first historical average opening change rate $G_{q_{avg}}$ when the accelerator pedal opening is in the starting interval based on the first opening change rate includes: calculating the first historical average opening change rate $G_{q_{avg}}$ by using the following formula:

$$G_{q_{avg}} = \sum_{i=1}^{m} k_i G_{q_i},$$

where, $\sum_{i=1}^{m} k_i = 1$, where m is the selected number of the first opening change rate, i is a serial number, $G_{q_i}$ is an i-th first opening change rate in a statistical time, k, is a weighting coefficient corresponding to $G_{q_i}$, a value of k, decreases sequentially from i=1 to i=m; and/or calculating a second historical average opening change rate $G_{c_{avg}}$ when the accelerator pedal opening is in the overtaking interval based on the second opening change rate includes: calculating the second historical average opening change rate $G_{c_{avg}}$ by using the following formula:

$$G_{c_{avg}} = \Sigma_{j=1}^{q} w_j G_{c_j},$$

Where, $\Sigma_{i=1}^{m} w_j = 1$, where, q is the selected number of the second opening change rate, j is a serial number, $G_{c_j}$ is a j-di second opening change rate in a statistical time, $w_j$ is a weighting coefficient corresponding to $G_{c_j}$, a value of $w_j$ decreases sequentially from j=1 to j=m.

Further, the counting a second opening change rate when the accelerator pedal opening is in an overtaking interval and when the accelerator pedal opening is increased includes: removing the second opening change rate which is less than or equal to a maximum opening change rate of the accelerator pedal opening under a normal driving condition from the statistical second opening change rate.

Correspondingly, a power distribution management method for a hybrid vehicle is further provided according to the present application, which includes: receiving a driver feature coefficient sent by a server, in which the driver feature coefficient is obtained based on an opening change rate of an accelerator pedal; determining a first accelerator pedal opening threshold based on the driver feature coefficient and a corresponding relationship between the driver feature coefficient and an accelerator pedal opening threshold; determining an accelerator pedal opening upper limit when a motor solely performs driving; determining a smaller one of the first accelerator pedal opening threshold and the accelerator pedal opening upper limit as an accelerator pedal opening threshold for starting an engine; and controlling the starting of the engine based on the accelerator pedal opening threshold for starting the engine.

Further, the determining an accelerator pedal opening upper limit when a motor solely performs driving includes: determining an output maximum torque when the motor solely performs driving; and determining an accelerator pedal opening corresponding to the maximum torque as the accelerator pedal opening upper limit based on the output maximum torque when the motor solely performs driving, and a corresponding relationship between the accelerator pedal opening and a required torque.

Further, the determining an output maximum torque when the motor solely performs driving includes: determining the maximum torque according to the following formula:

$$T_{max} = \min\left\{\frac{9550 P_{max}}{n}, T_m\right\}$$

where, $T_{max}$ is the maximum torque, $P_{max}$ is a maximum discharge power of a current battery, n is a current rotational speed of the motor, and $T_m$ is a current maximum output torque predicted by the motor.

Correspondingly, a power distribution management device for a hybrid vehicle is further provided according to the present application, which includes a receiving module, configured to receive an accelerator pedal opening information sent by the hybrid vehicle; a statistics module, configured to respectively count, based on the accelerator pedal opening information, a first opening change rate when an accelerator pedal opening is in a starting interval and when the accelerator pedal opening is increased and a second opening change rate when the accelerator pedal opening is in an overtaking interval and when the accelerator pedal opening is increased, in which the starting interval corresponds to a first preset range of the accelerator pedal opening, and the overtaking interval corresponds to a second preset range of the accelerator pedal opening; a calculation module, configured to calculate a driver feature coefficient based on the first opening change rate and the second opening change rate; and a sending module, configured to send the driver feature coefficient to the hybrid vehicle, so that the hybrid vehicle determines an accelerator pedal opening threshold based on the driver feature coefficient.

Correspondingly, a power distribution management device for a hybrid vehicle is further provided according to the present application, which includes a receiving module, configured to receive a driver feature coefficient sent by a server, in which the driver feature coefficient is obtained based on an opening change rate of an accelerator pedal; a first determination module, configured to determine a first accelerator pedal opening threshold based on the driver feature coefficient and a corresponding relationship between the driver feature coefficient and an accelerator pedal opening threshold; a second determination module, configured to determine an accelerator pedal opening upper limit when a motor solely performs driving; a third determination module, configured to determine a smaller one of the first accelerator pedal opening threshold and the accelerator pedal opening upper limit as an accelerator pedal opening threshold for starting an engine; and a control module, configured to control the starting of the engine based on the accelerator pedal opening threshold for starting the engine.

Correspondingly, a machine-readable storage medium is provided according to the present application, which stores instructions, and the instructions are used to cause a machine to perform the power distribution management method for the hybrid vehicle as described above.

Compared with the conventional technology, the power distribution management method and device for the hybrid vehicle have the following advantages.

(1) In calculating the driver feature coefficient based on the opening change rate of the accelerator pedal stepped on by the driver, the opening change rates of the accelerator pedal in the starting interval and in the overtaking interval are considered because the opening change rates of the accelerator pedal in the two intervals can highlight the driving habits of the driver. Therefore, the calculated feature coefficient can better reflect the habit of stepping on the accelerator pedal of the driver, and further reflect the opening requirements for starting the engine of the driver. Therefore, the accelerator pedal opening threshold determined based on the driver feature coefficient by the hybrid vehicle can satisfy the habit of stepping on the accelerator pedal of the driver.

(2) The hybrid vehicle determines the first accelerator pedal opening threshold based on the driver feature coefficient, determines the accelerator pedal opening upper limit when the motor solely performs driving, determines the smaller one of the first accelerator pedal opening threshold and the accelerator pedal opening upper limit as the second accelerator pedal opening threshold for starting the engine, and controls the starting of the engine based on the second accelerator pedal opening threshold. In this way, the accelerator pedal opening threshold can change with the habit of stepping on the accelerator pedal of the driver, so that the starting of the engine can better meet the needs of different drivers.

Other features and advantages of the present application are described in detail in the following specific embodiments.

BRIEF DESCRIPTION OF THE DRAWINGS

The drawings constituting a part of the present application are used to provide a further understanding of the present application, and the exemplary embodiments and descriptions of the present application are used to explain the technical solutions of the present application, and do not constitute an improper limitation to the present application. In the drawings.

DETAILED DESCRIPTION OF THE PREFERRED EMBODIMENTS

It should be noted that embodiments of the present application and features in the embodiments may be in combination with each other as long as there is no conflict.

The present application is described in detail below in conjunction with the embodiments and with reference to the drawings.

At present, in the power distribution strategy of the hybrid vehicle, the accelerator pedal opening threshold for starting the engine is a constant value determined mainly based on an engine characteristic curve, a motor characteristic curve and the project experience of the engineer. However, due to the differences in the use habits, for example, aggressive drivers may expect the engine to start early, and gentle drivers may expect the engine to start lately. Therefore, the constant accelerator pedal opening threshold cannot accurately meet the needs of each driver.

In addition, the engine is started lately when the accelerator pedal opening threshold is relatively higher, and the power of the motor cannot meet the power demand. The engine is started early when the accelerator pedal opening threshold is relatively low, but the fuel consumption of the vehicle may increase after the engine is started, and the low-cost electric energy cannot be fully utilized. Therefore, the control strategy of the constant accelerator pedal opening threshold cannot ensure that the economic performance and power demand of each vehicle meet the target demand.

Based on the above reasons, a power distribution management method and device for a hybrid vehicle are provided according to the present application, which are configured to solve the technical problem that the constant accelerator pedal opening threshold cannot accurately fit the driving habits of each driver, while the economic performance and power demand of the vehicle are taken into account.

Figure 1:
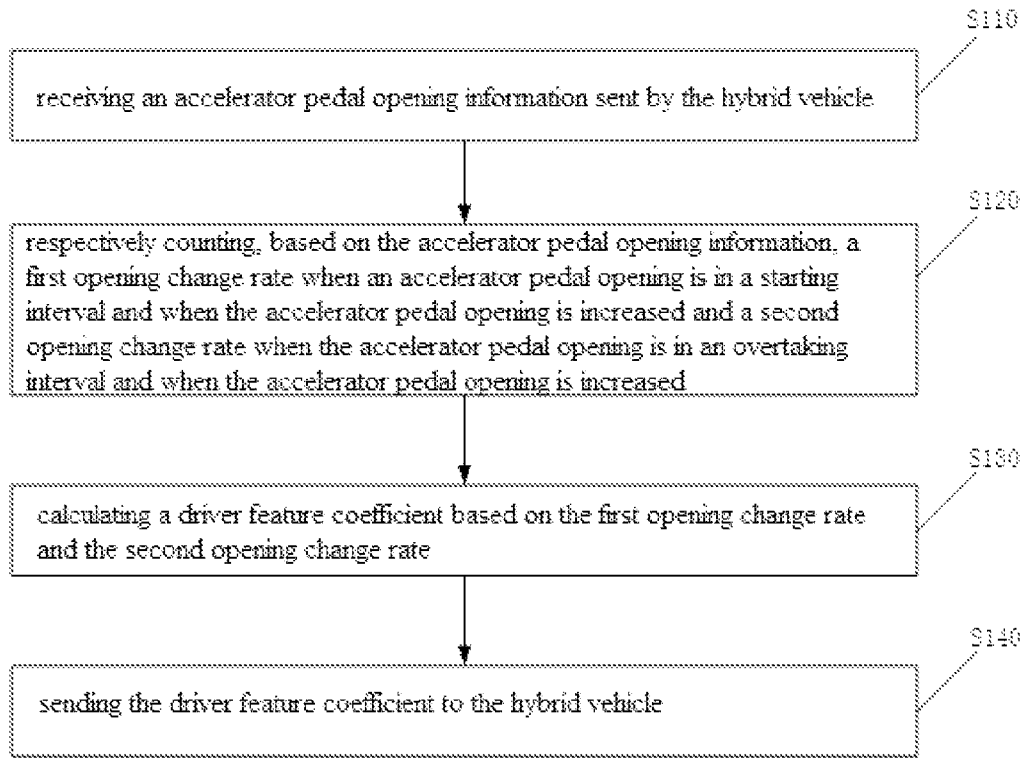
FIG. 1 is a schematic flowchart showing a power distribution management method for a hybrid vehicle executed by a server according to an embodiment of the present application.

FIG. 1 is a schematic flowchart showing a power distribution management method for a hybrid vehicle executed by a server according to an embodiment of the present application. As shown in FIG. 1, a power distribution management method for a hybrid vehicle is provided according to the present application, and the method is executed by the server. The server can communicate with a vehicle networking module of the hybrid vehicle and obtain the data of the hybrid vehicle through the vehicle networking module, or send data to the hybrid vehicle through the vehicle networking module. The method includes step S110 to step S140.

In step S110, receiving an accelerator pedal opening information sent by the hybrid vehicle.

The vehicle controller of the hybrid vehicle can collect the accelerator pedal opening information in real time, and transmit the collected accelerator pedal opening information to the vehicle networking module. Then the vehicle networking module sends the accelerator pedal opening information to the server, and the server receives the accelerator pedal opening information.

In step S120, respectively counting, based on the accelerator pedal opening information, a first opening change rate when an accelerator pedal opening is in a starting interval and when the accelerator pedal opening is increased and a second opening change rate when the accelerator pedal opening is in an overtaking interval and when the accelerator pedal opening is increased.

In the present application, the starting interval corresponds to an accelerator pedal opening range when the vehicle starts, the overtaking interval corresponds to an accelerator pedal opening range when the vehicle overtakes, and the accelerator pedal opening ranges corresponding to the starting interval and the overtaking interval can be obtained through offline statistics. A first preset range of the accelerator pedal opening corresponding to the starting interval may range from 10% to 30%. The accelerator pedal opening is substantially affected by the road conditions when the vehicle is moved and when the road is congested, which cannot represent the driving habits of users. Therefore, the range from 0% to 10% is not considered in the starting interval. A second preset range of the accelerator pedal opening corresponding to the overtaking interval may range from 60% to 80%. The ranges corresponding to the starting interval and the overtaking interval can be adjusted according to the states of the vehicle, for example, according to the volume or weight of the vehicle.

The first opening change rate $G_q$ when the accelerator pedal opening is in the starting interval and when the accelerator pedal opening is increased is calculated according to the following formula:

$$G_q = \frac{K_{t+\Delta t} - K_t}{\Delta t}, \ 30\% > K_t > 10\% \tag{1}$$

In the present application, the first opening change rate of $G_q > 0$ is counted, the change rate when the accelerator pedal opening is decreased in the starting interval does not take into account, because the power distribution strategy may not be changed when the accelerator pedal opening is decreased.

The second opening change rate $G_c$ when the accelerator pedal opening is in the overtaking interval and when the accelerator pedal opening is increased is calculated according to the following formula:

$$G_c = \frac{K_{t+\Delta t} - K_t}{\Delta t}, \ 80\% > K_t > 60\% \tag{2}$$

In the present application, the second opening change rate of $G_c > 0$ is counted, the change rate when the accelerator pedal opening is decreased in the overtaking interval does not take into account, because the power distribution strategy may not be affected when the accelerator pedal opening is decreased.

In formula (1) and formula (2), $K_{t+\Delta t}$ is the accelerator pedal opening at time $t+\Delta t$, $K_t$ is the accelerator pedal opening at time t, and $\Delta t$ is a sampling interval, generally at the ms level, which can be consistent with the sampling interval of the vehicle controller for the accelerator pedal opening information.

In an embodiment, the second opening change rate which is less than or equal to a maximum opening change rate of the accelerator pedal opening under a normal driving condition is removed from the statistical second opening change rate, that is, $G_c > G_T$ is met, where $G_T$ represents the maximum opening change rate under the normal driving condition, so that the case that the accelerator pedal opening meets the range of the overtaking interval, but actually belongs to the normal driving condition can be excluded.

In the present application, the opening change rates of the accelerator pedal in the starting interval and the overtaking interval are considered, because the opening change rates of the accelerator pedal in the two intervals can highlight the driving habits of the driver. In other conditions, the opening change rates of the accelerator pedal for different drivers are basically the same or are greatly affected by the road condition, which cannot highlight the driving habits of the driver.

In step S130, calculating a driver feature coefficient based on the first opening change rate and the second opening change rate.

The driver feature coefficient can reflect the habit of stepping on the accelerator pedal of the driver, and further reflect the opening requirements for starting the engine of the driver.

In step S140, sending the driver feature coefficient to the hybrid vehicle.

The hybrid vehicle can determine an accelerator pedal opening threshold suitable for the driving habits of the driver based on the driver feature coefficient, so that the starting of the engine is more suitable for the needs of different drivers.

Figure 2:
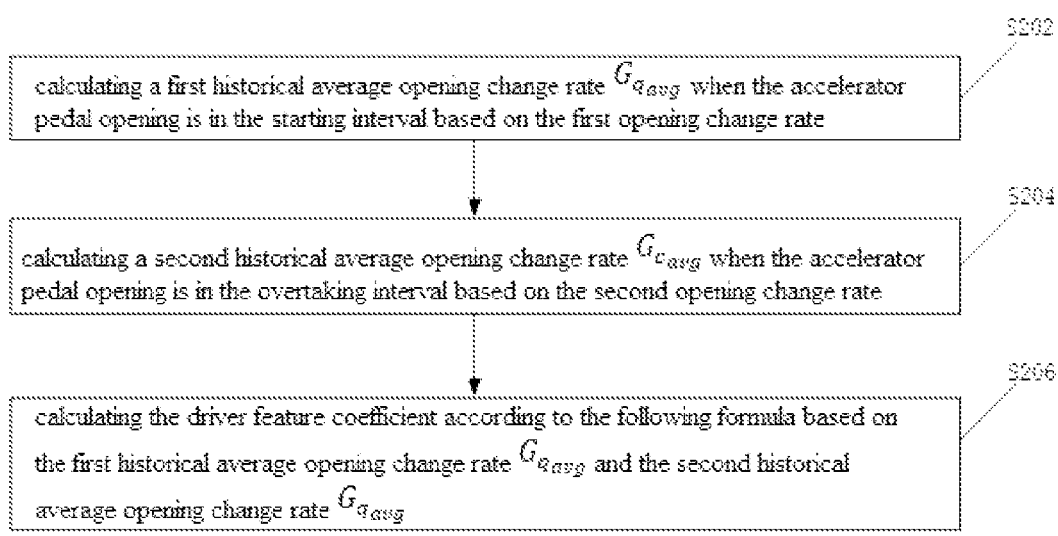
FIG. 2 is a schematic flowchart showing calculating a driver feature coefficient based on a first opening change rate and a second opening change rate.

Next, how to calculate the driver feature coefficient based on the first opening change rate and the second opening change rate is specifically described in detail. FIG. 2 is a schematic flowchart showing calculating the driver feature coefficient based on the first opening change rate and the second opening change rate. As shown in FIG. 2, the calculation of the driver feature coefficient includes step S202 to step S206.

In step S202, calculating a first historical average opening change rate $G_{q_{avg}}$ when the accelerator pedal opening is in the starting interval based on the first opening change rate.

In an optional embodiment, the weighted average method can be used to calculate the first historical average opening change rate.

The first historical average opening change rate $G_{q_{avg}}$ can be calculated according to the following formula:

$$G_{q_{avg}} = \Sigma_{i=1}^{m} k_i G_{q_i}, \tag{3}$$

where, $\Sigma_{i=1}^{m} k_i = 1$, where m is the selected number of the first opening change rate, i is a serial number, $G_{q_i}$ is an i-th first opening change rate in a statistical time, $k_i$ is a weighting coefficient corresponding to $G_{q_i}$, and a value of k, decreases sequentially from i=1 to i=m.

The selected number of the first opening change rate can be set to any suitable value according to actual needs. Taking m=30 as an example, the first historical average opening change rate $G_{q_{avg}}$ is:

$$G_{q_{avg}} = k_1 * G_{q_1} + k_2 * G_{q_2} + \ldots + k_{30} * G_{q_{30}} \tag{4}$$

where, $k_1 + k_2 + \ldots + k_{30} = 1$, $k_1 > k_2 > \ldots > k_{30}$, and the value from $k_1$ to $k_{30}$ can be selected as any value that satisfies the above two conditions. In the present application, m=30 is only used as an example, not as a limitation. m can be set to any suitable value as required. The first opening change rates of the last m times are selected in the present application to represent the recent driving habits of the driver. Moreover, the first opening change rate closer to the current time is more able to represent the recent driving habits of the driver, and the corresponding weighting coefficient (that is, the value of $k_i$) is larger.

In another optional embodiment, the arithmetic average method can be used to calculate the first historical average opening change rate, or other arbitrary average methods can be used to calculate the first historical average opening change rate.

In step S204, calculating a second historical average opening change rate $G_{c_{avg}}$ when the accelerator pedal opening is in the overtaking interval based on the second opening change rate.

The second historical average opening change rate $G_{c_{avg}}$ can be calculated according to the following formula:

$$G_{c_{avg}} = \Sigma_{j=1}^{q} w_j G_{c_j}, \tag{5}$$

where, $\Sigma_{i=1}^{m} w_j = 1$, where, q is the selected number of the second opening change rate, j is a serial number, $G_{c_j}$ is a j-di second opening change rate in a statistical time, $w_j$ is a weighting coefficient corresponding to $G_{c_j}$, and a value of $w_1$ decreases sequentially from j=1 to j=m.

The selected number of the second opening change rate can be set to any suitable value according to actual needs. Taking q=30 as an example, the first historical average opening change rate $G_{c_{avg}}$ is:

$$G_{c_{avg}} = w_1 * G_{c_1} + w_2 * G_{c_2} + \ldots + w_{30} * G_{c_{30}} \tag{6}$$

where, $w_1+w_2+\ldots+w_{30}=1$, $w_1>w_2>\ldots>w_{30}$, and the value from iv' to $W_{30}$ can be selected as any value that satisfies the above two conditions. In the present application, q=30 is only used as an example, not as a limitation. q can be set to any suitable value as required. The second opening change rates of the last q times are selected in the present application to represent the recent driving habits of the driver. Moreover, the second opening change rate closer to the current time is more able to represent the recent driving habits of the driver, and the corresponding weighting coefficient (that is, the value of $w_j$) is larger.

In another optional embodiment, the arithmetic average method can be used to calculate the second historical average opening change rate, or other arbitrary average methods can be used to calculate the second historical average opening change rate.

In step S206, calculating the driver feature coefficient according to the following formula based on the first historical average opening change rate $G_{q_{avg}}$ and the second historical average opening change rate $G_{q_{avg}}$:

$$K = \frac{k_q * G_{q_{avg}} + k_c * G_{c_{avg}}}{G_n}, \quad (7)$$

where, $k_q+k_c=1$, where, K is the driver feature coefficient, $k_q$ is a weighting coefficient corresponding to the first historical average opening change rate $G_{q_{avg}}$, $k_c$ is a weighting coefficient corresponding to a second historical average opening change rate $G_{q_{avg}}$, and $G_n$ is a preset opening change rate, and $G_n$ can be a standard opening change rate determined based on the New European Driving Cycle (NEDC) test standard.

Since the change rate of the accelerator pedal opening in starting interval is easier to show the features of the driver, preferably, $k_q > k_c$ can be set.

The driver feature coefficient calculated according to formula (7) can be sent to the hybrid vehicle. The hybrid vehicle can determine an accelerator pedal opening threshold suitable for the driving habits of the driver based on the driver feature coefficient, so that the starting of the engine is more suitable for the needs of different drivers.

Figure 3:
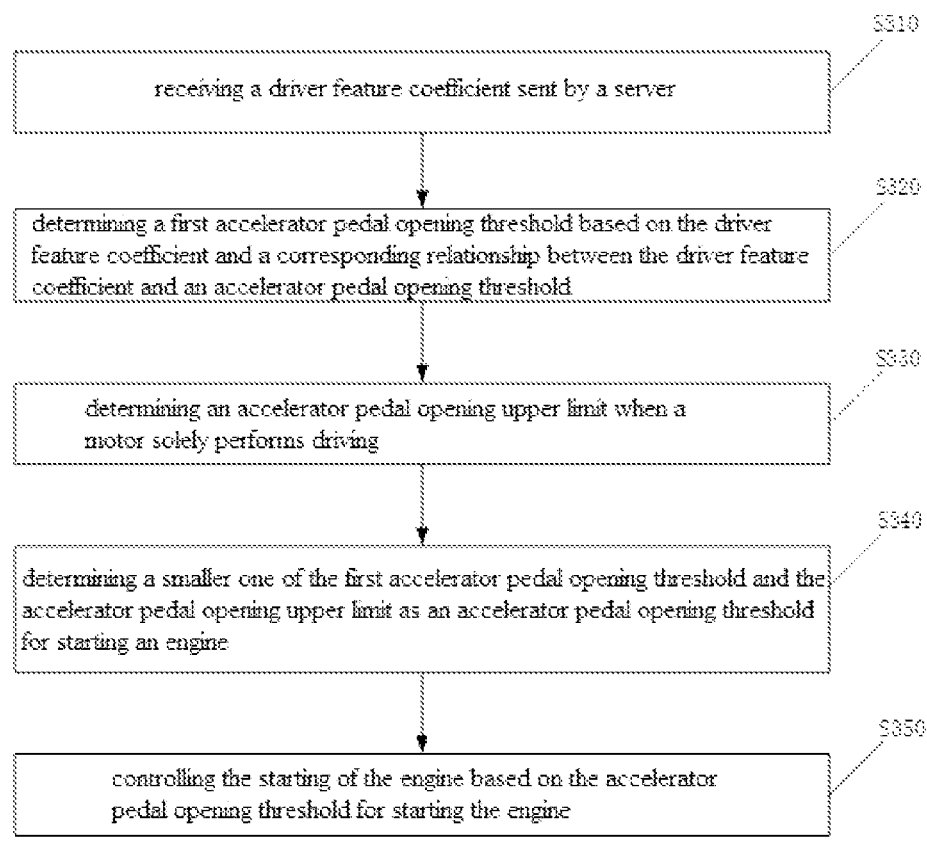
FIG. 3 is a schematic flowchart showing a power distribution management method for a hybrid vehicle executed by a vehicle controller according to an embodiment of the present application.

FIG. 3 is a schematic flowchart showing a power distribution management method for a hybrid vehicle executed by a vehicle controller according to an embodiment of the present application. As shown in FIG. 3, a power distribution management method for a hybrid vehicle is further provided according to the present application, the method can be executed by the vehicle controller of the hybrid vehicle, and the hybrid vehicle can communicate with the server through the vehicle networking module. The method includes step S310 to step S350.

In step S310, receiving a driver feature coefficient sent by a server.

The driver feature coefficient can be obtained by the server based on an opening change rate of an accelerator pedal. The server can specifically calculate the driver feature coefficient according to the power distribution management method for the hybrid electric vehicle executed by the server as described above.

The driver feature coefficient is sent to the hybrid vehicle after the driver feature coefficient is calculated by the server. The vehicle networking module of the hybrid vehicle receives the driver feature coefficient, and sends the driver feature coefficient to the vehicle controller.

In step S320, determining a first accelerator pedal opening threshold based on the driver feature coefficient and a corresponding relationship between the driver feature coefficient and an accelerator pedal opening threshold.

Figure 4:
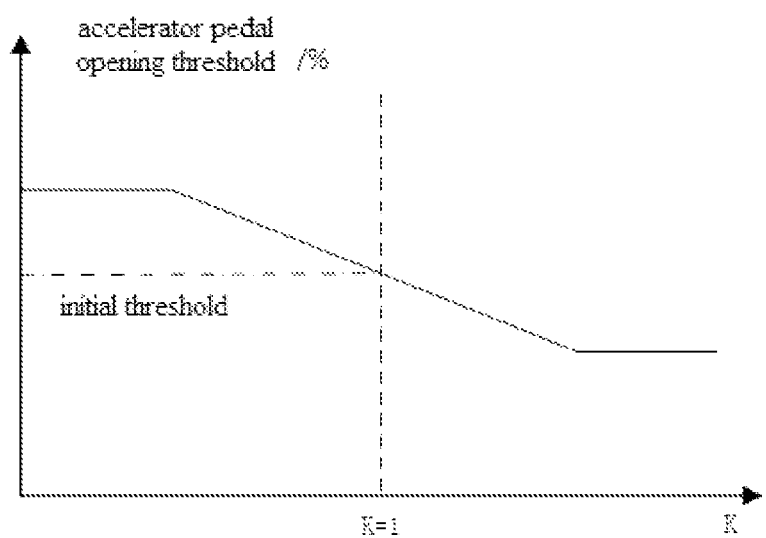
FIG. 4 is a corresponding curve diagram between the driver feature coefficient and an accelerator pedal opening threshold.

The corresponding relationship between the driver feature coefficient and the accelerator pedal opening threshold can be obtained by pre-testing, and the vehicle controller can pre-store the corresponding relationship between the driver feature coefficient and the accelerator pedal opening threshold. The corresponding relationship is, for example, a corresponding curve between the driver feature coefficient and the accelerator pedal opening threshold. As shown in FIG. 4, in a case that the value of K is less than a first value, it corresponds to a constant larger accelerator pedal opening threshold; in a case that the value of K is greater than a second value (the second value is larger than the first value), it corresponds to a constant smaller accelerator pedal opening threshold; in a case that the value of K is between the first value and the second value, the accelerator pedal opening threshold decreases with the increase of the value of K. K=1 corresponds to an initial setting value of the accelerator pedal opening threshold. Alternatively, the corresponding relationship may be a corresponding table between the driver feature coefficient and the accelerator pedal opening threshold, or a functional relationship between the driver feature coefficient and the accelerator pedal opening threshold.

In step S330, determining an accelerator pedal opening upper limit when a motor solely performs driving.

The accelerator pedal opening upper limit is limited by the current performance of the vehicle. Specifically, an output maximum torque $T_{max}$ when the motor solely performs driving can be first determined. The maximum torque $T_{max}$ can be determined according to the following formula:

$$T_{max} = \min\left\{\frac{9550 P_{max}}{n}, T_m\right\} \quad (8)$$

where, $P_{max}$ is a maximum discharge power of a current battery, n is a current rotational speed of the motor, and $T_m$ is a current maximum output torque predicted by the motor.

$$\frac{9550 P_{max}}{n}$$

represents the maximum torque output by the motor calculated based on the maximum discharge power of the current battery. In addition, the motor can predict a current maximum output torque $T_m$ based on its own hardware states (such as temperature and a rotational speed), and transmit the predicted current maximum output torque $T_m$ to the vehicle controller. The vehicle controller selects the smaller one between $$\frac{9550 P_{max}}{n}$$

and $T_m$ as the output maximum torque $T_{max}$ when the motor solely performs driving.

After the vehicle controller determines the output maximum torque $T_{max}$ when the motor solely performs driving, the vehicle controller can determine an accelerator pedal opening corresponding to the maximum torque $T_{max}$ as the accelerator pedal opening upper limit based on the output maximum torque $T_{max}$ when the motor solely performs driving and a corresponding relationship between the accelerator pedal opening and a required torque.

The output maximum torque when the motor solely performs driving when the motor solely performs driving is used as the required torque, and the accelerator pedal opening corresponding to the maximum torque is determined as the accelerator pedal opening upper limit.

Figure 5:
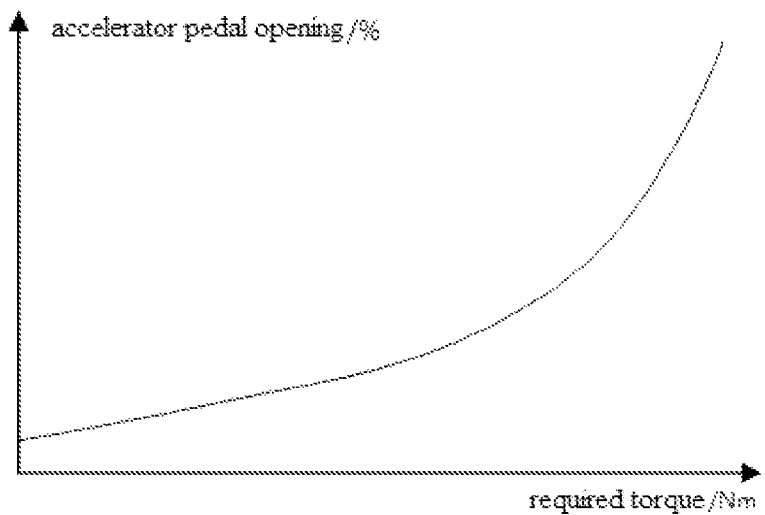
FIG. 5 is a corresponding curve diagram between an accelerator pedal opening and a required torque.

The corresponding relationship between the accelerator pedal opening and the required torque can be obtained by pre-testing, and the vehicle controller can pre-store the corresponding relationship. The corresponding relationship may be a corresponding curve between the accelerator pedal opening and the required torque, as shown in FIG. 5. Alternatively, the corresponding relationship may be a corresponding table between the driver feature coefficient and the accelerator pedal opening threshold, or a functional relationship between the driver feature coefficient and the accelerator pedal opening threshold.

In step S340, determining a smaller one of the first accelerator pedal opening threshold and the accelerator pedal opening upper limit as an accelerator pedal opening threshold for starting an engine.

In step S350, controlling the starting of the engine based on the accelerator pedal opening threshold for starting the engine.

Figure 6:
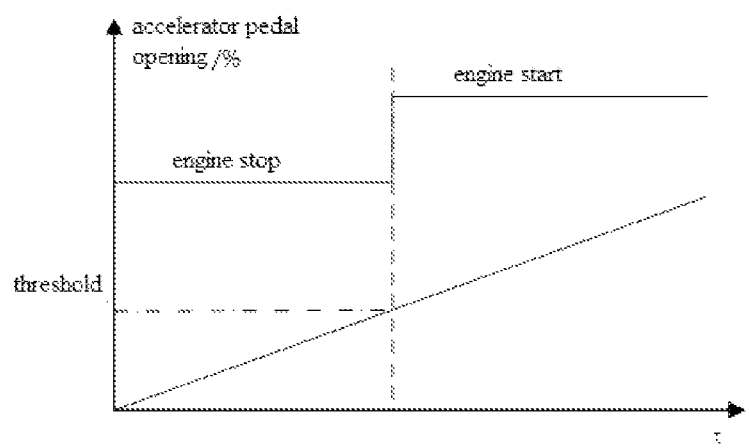
FIG. 6 is a schematic view showing controlling the starting of an engine based on the accelerator pedal opening threshold.

Specifically, as shown in FIG. 6, the vehicle controller can control the engine to turn off when the accelerator pedal opening is less than the accelerator pedal opening threshold, and the vehicle controller can control the engine to start when the accelerator pedal opening is not less than the accelerator pedal opening threshold.

In the present application, the smaller one of the first accelerator pedal opening threshold calculated based on the driver feature coefficient and the accelerator pedal opening upper limit limited by the current performance of the vehicle is determined as the accelerator pedal opening threshold for starting the engine next time, so that the determination of the accelerator pedal opening threshold takes into account the driving habits of the driver and the performance of the vehicle, finally, the process of controlling the starting of the engine based on the accelerator pedal opening threshold not only fits the driving habits of the driver, but also takes into account the economic performance and the power demand of the vehicle.

Figure 7:
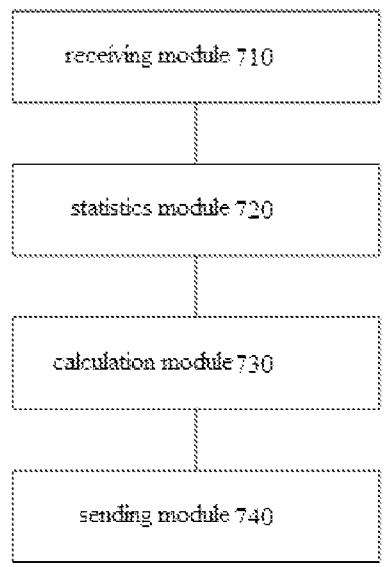
FIG. 7 is a structural block diagram of a power distribution management device for a hybrid vehicle applicable to the server according to an embodiment of the present application.

FIG. 7 is a structural block diagram of a power distribution management device for a hybrid vehicle applicable to the server according to an embodiment of the present application. As shown in FIG. 7, a power distribution management device for a hybrid vehicle is provided according to the present application, and the device is applicable to a server. The device includes: a receiving module 710, configured to receive an accelerator pedal opening information sent by the hybrid vehicle; a statistics module 720, configured to respectively count, based on the accelerator pedal opening information, a first opening change rate when an accelerator pedal opening is in a starting interval and when the accelerator pedal opening is increased and a second opening change rate when the accelerator pedal opening is in an overtaking interval and when the accelerator pedal opening is increased, where the starting interval corresponds to a first preset range of the accelerator pedal opening, and the overtaking interval corresponds to a second preset range of the accelerator pedal opening; a calculation module 730, configured to calculate a driver feature coefficient based on the first opening change rate and the second opening change rate; and a sending module 740, configured to send the driver feature coefficient to the hybrid vehicle, so that the hybrid vehicle determines an accelerator pedal opening threshold based on the driver feature coefficient.

In some optional embodiments, the calculation module 730 includes: a first calculation unit, configured to calculate a first historical average opening change rate $G_{q_{avg}}$ when the accelerator pedal opening is in the starting interval based on the first opening change rate; a second calculation unit, configured to calculate a second historical average opening change rate $G_{q_{avg}}$ when the accelerator pedal opening is in the overtaking interval based on the second opening change rate; and a third calculation unit, configured to calculate the driver feature coefficient according to the formula (7) based on the first historical average opening change rate $G_{q_{avg}}$ and the second historical average opening change rate $G_{q_{avg}}$.

The driver feature coefficient calculated by the server can be send to the hybrid vehicle. The hybrid vehicle can determine an accelerator pedal opening threshold suitable for the driving habits of the driver based on the driver feature coefficient, so that the starting of the engine is more suitable for the needs of different drivers.

The specific working principles and benefits of the power distribution management device for the hybrid vehicle applicable to the server according to the present application are the same as those of the power distribution management method for the hybrid vehicle executed by the server according to the present application, and are not described here.

Figure 8:
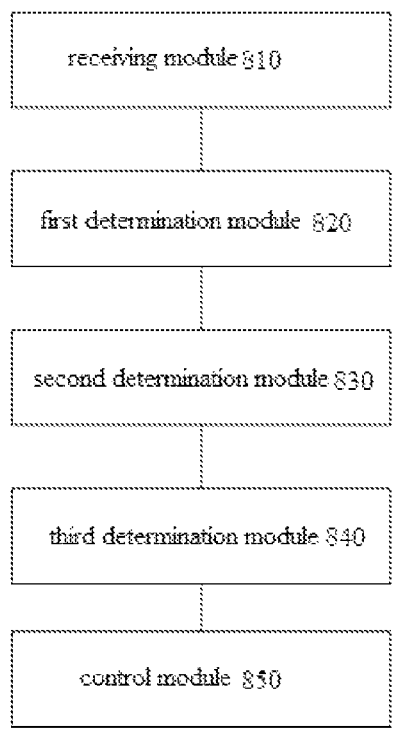
FIG. 8 is a structural block diagram of a power distribution management device for a hybrid vehicle applicable to the vehicle controller according to an embodiment of the present application.

FIG. 8 is a structural block diagram of a power distribution management device for a hybrid vehicle applicable to the vehicle controller according to an embodiment of the present application. As shown in FIG. 8, a power distribution management device for a hybrid vehicle is further provided according to an embodiment of the present application, the device is applicable to a vehicle controller of the hybrid vehicle, and the device includes a receiving module 810, configured to receive a driver feature coefficient sent by a server, where the driver feature coefficient is obtained based on an opening change rate of an accelerator pedal; a first determination module 820, configured to determine a first accelerator pedal opening threshold based on the driver feature coefficient and a corresponding relationship between the driver feature coefficient and an accelerator pedal opening threshold; a second determination module 830, configured to determine an accelerator pedal opening upper limit when a motor solely performs driving; a third determination module 840, configured to determine a smaller one of the first accelerator pedal opening threshold and the accelerator pedal opening upper limit as an accelerator pedal opening threshold for starting an engine; and a control module 850, configured to control the starting of the engine based on the accelerator pedal opening threshold for starting the engine.

The smaller one of the first accelerator pedal opening threshold calculated based on the driver feature coefficient and the accelerator pedal opening upper limit limited by the current performance of the vehicle is determined as the accelerator pedal opening threshold for starting the engine next time, so that the determination of the accelerator pedal opening threshold takes into account the driving habits of the driver and the performance of the vehicle, finally, the process of controlling the starting of the engine based on the accelerator pedal opening threshold not only fits the driving habits of the driver, but also takes into account the economic performance and the power demand of the vehicle.

The specific working principles and benefits of the power distribution management device for the hybrid vehicle applicable to the vehicle controller according to the present application are the same as those of the power distribution management method for the hybrid vehicle executed by the server according to the present application, and are not described here.

The server according to the present application can communicate with the hybrid vehicle through the vehicle networking module arranged on the hybrid vehicle.

The server can specifically perform data analysis, data cleaning, data storage, data operation, and data conversion. The data uploaded from the hybrid vehicle to a cloud platform needs to be converted into a form that can be used for calculation, and this process is data analysis. The hybrid vehicle continues to upload data to the server when it wakes up. When the vehicle is in normal use, actions for non-driving and charging, such as opening and closing the vehicle door, remote inquiring the vehicle conditions, may also wake up the vehicle, so that the hybrid vehicle uploads many invalid data. Therefore, it is necessary to clean the data to remove invalid data, for example, only the data related to the analysis of the accelerator pedal opening can be kept when the method described according to the present application is executed. The server can uniformly store the sorted data to the database which is arranged according to time for calling the data in each time period. The method according to the present application can be a specific process of performing data operation. The calculation results are converted into CAN messages and sent to the hybrid vehicle before the calculation results are sent to the hybrid vehicle.

The vehicle networking module is arranged inside the vehicle, and is wirelessly connected with the server through the network connection protocol. The vehicle networking module can perform two functions: data routing and data storage. When the data routing is performed, the vehicle networking module can perform the conversion between the in-vehicle communication protocol and the remote communication protocol. The communication between the vehicle and the server may be interrupted because the vehicle is often parked in the underground parking garage and other places with poor signals. A storage module is added to the vehicle networking module to store the operation data of the vehicle when the vehicle cannot communicate with the server, and the operation data is packaged and uploaded as a whole after reconnection.

The battery management system can transmit the current available discharge power to the vehicle controller. The engine can be started or stopped according to the control of the vehicle controller. The motor can send the predicted current maximum output torque to the vehicle controller. The vehicle controller can execute the power distribution management method for the hybrid vehicle executed by the vehicle controller according to the present application.

Correspondingly, a machine-readable storage medium is provided according to the present application, which stores instructions, and the instructions used to cause a machine to perform the power distribution management method for the hybrid vehicle according to any embodiment of the present application. The machine-readable control medium includes, but is not limited to, various mediums that are capable of storing a program code, such as a phase change memory (PRAM), a static random access memory (SRAM), a dynamic random access memory (DRAM), other random access memory (RAM), a read-only memory (ROM), an electrically erasable programmable read only memory (EEPROM), a flash memory or other memory, a CD-ROM read-only memory (CD-ROM), a digital versatile disc (DVD) or other optical storage, a magnetic cassette tape, a magnetic tape disk storage or other magnetic storage devices.

The foregoing description is only preferred embodiments of the present application, and is not intended to limit the present application. Any modification, equivalent replacement, improvement or the like made within the spirit and principles of the present application shall be included in the protection scope of the present application.

What is claimed is:

1. A power distribution management method for a hybrid vehicle, comprising:

receiving an accelerator pedal opening information sent by the hybrid vehicle;

respectively counting, based on the accelerator pedal opening information, a first opening change rate when an accelerator pedal opening is in a starting interval and when the accelerator pedal opening is increased and a second opening change rate when the accelerator pedal opening is in an overtaking interval and when the accelerator pedal opening is increased, wherein the starting interval corresponds to a first preset range of the accelerator pedal opening, and the overtaking interval corresponds to a second preset range of the accelerator pedal opening;

calculating a driver feature coefficient based on the first opening change rate and the second opening change rate; and sending the driver feature coefficient to the hybrid vehicle, so that the hybrid vehicle determines an accelerator pedal opening threshold based on the driver feature coefficient, wherein the calculating a driver feature coefficient based on the first opening change rate and the second opening change rate comprises:

calculating a first historical average opening change rate $G_{q_{avg}}$ when the accelerator pedal opening is in the starting interval based on the first opening change rate;

calculating a second historical average opening change rate $G_{c_{avg}}$ when the accelerator pedal opening is in the overtaking interval based on the second opening change rate; and calculating the driver feature coefficient according to the following formula based on the first historical average opening change rate $G_{q_{avg}}$ and the second historical average opening change rate $G_{c_{avg}}$:

$$K = \frac{k_q * G_{qavg} + k_c * G_{cavg}}{G_n},$$

wherein, $k_q + k_c = 1$, wherein, K is the driver feature coefficient, $k_q$ is a weighting coefficient corresponding to the first historical average opening change rate $G_{q_{avg}}$, $k_c$ is a weighting coefficient corresponding to the second historical average opening change rate $G_{c_{avg}}$, and $G_n$ is a preset opening change rate.

2. The power distribution management method for the hybrid vehicle according to claim 1, wherein the first opening change rate $G_q$ when the accelerator pedal opening is in the starting interval and when the accelerator pedal opening is increased is calculated according to the following formula:

$$G_q = \frac{K_{t+\Delta t} - K_t}{\Delta t};$$

wherein,
$K_{t+\Delta t}$ is the accelerator pedal opening at time $t+\Delta t$,
$K_t$ is the accelerator pedal opening at time t,
$K_t$ is in a range of 30%>$K_t$>10%, and
$\Delta t$ is a sampling interval.

3. The power distribution management method for a hybrid vehicle according to claim 1, wherein the second opening change rate $G_c$ when the accelerator pedal opening is in the overtaking interval and when the accelerator pedal opening is increased is calculated according to the following formula:

$$G_c = \frac{K_{t+\Delta t} - K_t}{\Delta t};$$

wherein,
$K_{t+\Delta t}$ is the accelerator pedal opening at time $t+\Delta t$,
$K_t$ is the accelerator pedal opening at time t,
$K_t$ is in a range of 80%>$K_t$>60%, and
$\Delta t$ is a sampling interval.

4. The power distribution management method for the hybrid vehicle according to claim 1, wherein $k_q$>$k_c$.

5. The power distribution management method for the hybrid vehicle according to claim 1, wherein the calculating a first historical average opening change rate $G_{q_{avg}}$ when the accelerator pedal opening is in the starting interval based on the first opening change rate comprises: calculating the first historical average opening change rate $G_{q_{avg}}$ by using the following formula:

$$G_{q_{avg}} = \Sigma_{i=1}^{m} k_i G_{q_i},$$

wherein, $\Sigma_{i=1}^{m} k_i = 1$,
wherein m is the selected number of the first opening change rate, i is a serial number, $G_{q_i}$ is an i-th first opening change rate in a statistical time, $k_i$ is a weighting coefficient corresponding to $G_{q_i}$, and a value of $k_i$ decreases sequentially from i=1 to i=m; and/or
the calculating a second historical average opening change rate $G_{c_{avg}}$ when the accelerator pedal opening is in the overtaking interval based on the second opening change rate comprises: calculating the second historical average opening change rate $G_{c_{avg}}$ by using the following formula:

$$G_{c_{avg}} = \Sigma_{j=1}^{q} w_j G_{c_j},$$

wherein, $\Sigma_{i=1}^{m} w_i = 1$,
wherein, q is the selected number of the second opening change rate, j is a serial number, $G_{c_j}$ is a j-th second opening change rate in a statistical time, $w_j$ is a weighting coefficient corresponding to $G_{c_j}$, and a value of $w_j$ decreases sequentially from j=1 to j=m.

6. A machine-readable storage medium, wherein the machine-readable storage medium stores instructions, and the instructions are used to cause a machine to perform: the power distribution management method for the hybrid vehicle according to claim 1.

* * * * *